United States Patent
Lundsgaard

(10) Patent No.: US 8,693,355 B2
(45) Date of Patent: Apr. 8, 2014

(54) JITTER BUFFER MANAGEMENT FOR POWER SAVINGS IN A WIRELESS COMMUNICATION DEVICE

(75) Inventor: Soren L. Lundsgaard, Inverness, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 749 days.

(21) Appl. No.: 12/819,406

(22) Filed: Jun. 21, 2010

(65) Prior Publication Data

US 2011/0310750 A1 Dec. 22, 2011

(51) Int. Cl.
*G01R 31/08* (2006.01)

(52) U.S. Cl.
USPC ........... 370/252; 370/329; 370/412; 370/516; 709/232; 455/41.2; 455/574; 710/52

(58) Field of Classification Search
USPC ......... 370/252, 276, 311, 329, 352, 412, 508, 370/516, 470; 711/103; 379/159; 375/371; 714/751; 455/41.2
See application file for complete search history.

(56) References Cited

U.S. PATENT DOCUMENTS

| 6,917,598 | B1 | 7/2005 | Emeott et al. | |
|---|---|---|---|---|
| 6,980,569 | B1 * | 12/2005 | Beyda et al. | 370/516 |
| 7,370,126 | B2 | 5/2008 | FitzGerald | |
| 7,492,752 | B2 | 2/2009 | Harris et al. | |
| 7,590,100 | B2 | 9/2009 | Smith et al. | |
| 7,603,146 | B2 | 10/2009 | Benveniste | |
| 7,697,447 | B2 | 4/2010 | Harris | |
| 8,024,510 | B2 * | 9/2011 | Rybak et al. | 711/103 |
| 8,031,728 | B2 * | 10/2011 | Horvath et al. | 370/412 |
| 2003/0103460 | A1 * | 6/2003 | Kamath et al. | 370/236.2 |
| 2004/0081106 | A1 * | 4/2004 | Bruhn | 370/276 |
| 2006/0251130 | A1 * | 11/2006 | Greer et al. | 370/508 |
| 2007/0281617 | A1 * | 12/2007 | Meylan et al. | 455/41.2 |
| 2008/0095106 | A1 * | 4/2008 | Malladi et al. | 370/329 |
| 2008/0165766 | A1 * | 7/2008 | Synnergren | 370/352 |
| 2008/0310448 | A1 * | 12/2008 | Hanov et al. | 370/470 |
| 2009/0190614 | A1 * | 7/2009 | Jougit et al. | 370/516 |
| 2010/0088570 | A1 * | 4/2010 | Choi et al. | 714/751 |
| 2010/0135166 | A1 * | 6/2010 | Ahluwalia | 370/252 |
| 2010/0172456 | A1 * | 7/2010 | Renaud et al. | 375/371 |

(Continued)

FOREIGN PATENT DOCUMENTS

| EP | 1419622 | 7/2009 |
|---|---|---|
| KR | 10-2006-0053004 A | 5/2006 |
| KR | 10-2010-0061966 A | 6/2010 |

OTHER PUBLICATIONS

Wi-Fi Alliance, WMM Power Save for Mobile and Portable WiFi Certified Devices, Dec. 2005.*

(Continued)

*Primary Examiner* — Michael Thier
*Assistant Examiner* — Vincelas Louis
(74) *Attorney, Agent, or Firm* — Brian M. Mancini

(57) ABSTRACT

A technique for jitter buffer management for improved power savings in a wireless communication device (100) includes defining (202) a jitter buffer threshold for the wireless communication device, determining (204) that an amount of packets in the jitter buffer falls below the threshold, sending a trigger (206) to obtain queued voice packets from an access point, downloading (208) queued voice packets from the access point, and adding (212) the voice packets from the access point to the jitter buffer in the wireless communication device (100).

14 Claims, 2 Drawing Sheets

(56) References Cited

U.S. PATENT DOCUMENTS

2010/0246788 A1* 9/2010 Menard et al. ............... 379/159
2010/0272030 A1* 10/2010 Babbar ......................... 370/329
2011/0019555 A1* 1/2011 Gotoh et al. .................. 370/252

OTHER PUBLICATIONS

International Search Report and Written Opinion dated Dec. 23, 2011 in related case PCT/US2011/040617.

* cited by examiner

JITTER BUFFER MANAGEMENT FOR POWER SAVINGS IN A WIRELESS COMMUNICATION DEVICE

FIELD OF THE DISCLOSURE

The present invention relates generally to jitter buffers for wireless communication devices and more particularly to jitter buffer management for power savings in a wireless communication device.

BACKGROUND

In Voice-over-IP (VoIP) communication systems, such as in a Wi-Fi network for example, a jitter buffer is a buffer in a receiver of a user device where voice packets can be received, stored and sent to the voice processor in evenly spaced intervals. Jitter is a variation in packet arrival time, which can occur because of nature of Wi-Fi communication networks, which have inherent intermittent delays. The jitter buffer purposely delays the received packets in order to minimize delay variations so that a user of the device experiences voice communications with very little latency. However, there is a problem with jitter buffers in battery-operated devices, wherein to overcome the intermittent delay issues, it has been necessary for a user device to continually communicate with an access point to maintain a stream of voice packets, which uses significant transmitter, and receiver, power resources. Although this is required when a battery-powered devices is transmitting voice packets, it can be a problem when the device is not transmitting, and has sufficient packets in its input buffer.

A solution to the problem has been to use power save operating modes. One of these modes allows legacy user devices to go into a sleep mode and wake-up periodically to listen to an access point's beacon. The AP buffers packets for a particular device if the device is in sleep mode, and indicates the availability of pending packets in the beacon frame. The user device, when it wakes up, checks the beacon to see if there are pending packets for it. If not, the user device goes back to sleep. Otherwise, the user device polls the AP to retrieve the packets. However, this solution still requires a user device to regularly wake up quite often, even if there are no packets waiting for it, which wastes power.

Another solution is to use scheduled or unscheduled Automatic Power Save Delivery, wherein a user device needs to send a trigger frame to the AP, to cause the AP to deliver packets to the user device. The user device will then receive and acknowledge voice packets sent from the AP until the end of a service period. However, in this solution the user device will continue to send trigger frames to the AP even if its jitter buffer is full, which wastes power.

Accordingly, there is a need for jitter buffer management for improved power savings in a wireless communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
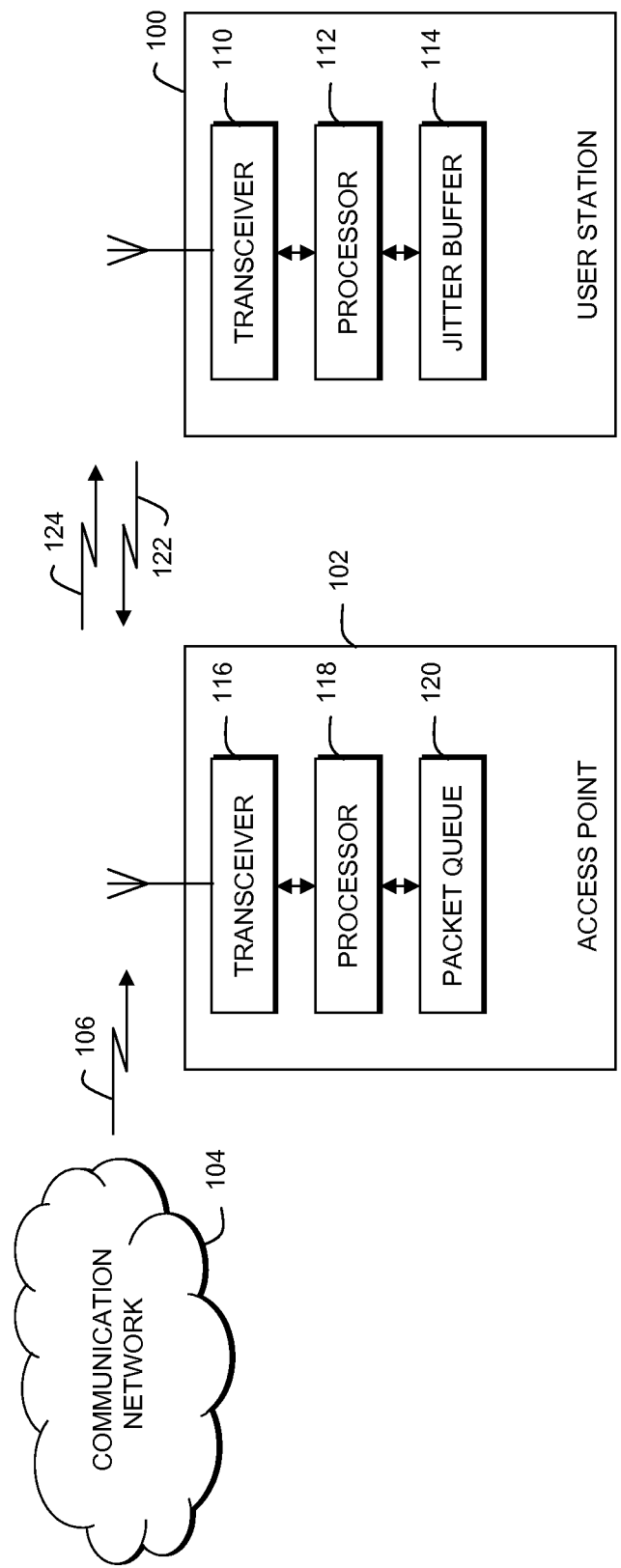
FIG. 1 is a simplified block diagram of a system, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides various jitter buffer management techniques for improved power savings in a wireless communication device. In particular, a user device of the present invention only sends polls or triggers for the AP to send voice packets when the jitter buffer of the user device is nearing empty. As used herein, the term "voice" packets includes any packet used for audio purposes. It should also be noted that the present invention is applicable to both static and dynamic jitter buffers. This invention is also applicable to jitter buffer management of video streams.

FIG. 1 is a block diagram depiction of a wireless communication network, including a wireless local-area network (WLAN) or other IEEE 802.11 wireless communication system, such as a Wi-Fi network. However, it should be recognized that the present invention is also applicable to other wireless communication systems. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a network that may be based on different wireless technologies. For example, the description that follows can apply to an access network that is IEEE 802.xx-based, employing wireless technologies such as IEEE's 802.11, 802.16, or 802.20, modified to implement embodiments of the present invention.

Referring to FIG. 1, there is shown a block diagram of an access point (AP) 102 and a user station (US) 100 adapted to support the inventive concepts of the present invention. Those skilled in the art will recognize that FIG. 1 does not depict all of the network equipment necessary for system to operate but only those system components and logical entities particularly relevant to the description of embodiments herein. For example, an access point, eNodeB, or base station can be connected with or comprise one or more devices such as wireless area network stations, which include access nodes, Media Access Controllers, AP controllers, and/or switches), base transceiver stations, base site controllers, packet control functions, packet control units, and/or radio network controllers. However, none of these other devices are specifically shown in FIG. 1.

AP 102 is depicted in FIG. 1 as comprising a processor 118 coupled to a transceiver 116 and memory or storage device for a packet queue 120. User station 100 is depicted as comprising a processor 112 coupled to a transceiver 110 and jitter buffer 114 for packets received from the AP 102. In general, components such as processors, memories, and transceivers are well-known. For example, the transceivers as described herein are operable to communicate together over an IEEE 802.11 interface. In addition, processors are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, each of the AP 100 and US 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the AP aspect of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

User stations or remote unit platforms are known to refer to a wide variety of consumer electronic platforms such as mobile stations, mobile units, mobile nodes, user equipment, subscriber equipment, subscriber stations, access terminals, remote terminals, terminal equipment, cordless handsets, gaming devices, personal computers, and personal digital assistants, and the like, all referred to herein as user stations. Each user station comprises a processor that can be further coupled to a keypad, a speaker, a microphone, a display, and other features, as are known in the art and therefore not shown.

Referring back to FIG. 1, an access point (AP) 102 and user station (US) 100 can be in the process of actively exchanging voice packets, as is known in the art. In this type of typical operation, the processor 112 will direct the US transceiver 110 to transmit a voice packet, which starts a service period during which any packets in a packet queue 120 for the US at the AP can be sent to the US by the transceiver 116 under direction of the processor 118. The AP processor 118 will direct the transceiver 116 to respond with a frame containing voice packets from the packet queue 120, with the "end of service period" mark if there is only one packet in the queue which ends the service period. The US can then respond with an acknowledgement. Of course, there can be many more control communications being exchanged which are not relevant to the present invention and therefore not described for the sake of brevity. The number of packets sent in a frame can be pre-negotiated between the access point and user station. Typically, a maximum of two voice packets are sent in one service period, but this can be pre-negotiated to be four, six, or an unlimited number of voice packets allowed by the particular communication interface (e.g. IEEE 802.11). If the pre-negotiated limit is unlimited, then the last packet transmitted must be marked with the "end of service period" mark.

The US processor 112 stores voice packets received by the transceiver 110 from the AP 102 in a jitter buffer 114. The jitter buffer purposely delays the received packets (for about 180 ms) in order to minimize delay variations in the delivery of packets from the communication network 104, so that a user of the device 100 experiences voice communications with very little latency. A jitter buffer can include a high water mark and low water mark. A jitter buffer that is full to the high water mark should guarantee continuous voice communication without audio gaps. The low water mark describes a timing point where audio in the user device will be cutoff, which is to be avoided. The high water mark is achieved when the network latency is low. The low water mark is achieved when the network latency is high. If the network latency exceeds the jitter buffer's size, the low water mark will decrease to zero and it is possible that the US will starve for packets. The low water mark is a function of the initial setting of the jitter buffer, the variability of the delay in the network and the actual delay of the network when the jitter buffer is first filled. The present invention introduces a new threshold in the jitter buffer which is generally lower than the low water mark, as will be detailed below.

Both the other party (e.g. AP) and US 100 can have periods where their transceivers 116 and 110 are not transmitting, i.e. silent voice. In addition, the US 100 could purposely be muted, which of course keeps the transmitter from transmitting outgoing voice packets. The present invention provides different operations depending on whether the other party transmitting voice and/or the US are generating voice packets, as will be detailed below.

Generally, the AP packet queue 120 will be accumulating packets 106 from the communication network 104 and other party approximately every twenty milliseconds while there are no voice packet transmissions from the US.

In the prior art, the responsibilities of the US when it is not generating any voice packets to send to the AP is to trigger a periodic download of queued packets from the AP, usually at the same interval as packets are generated (typically twenty milliseconds) from the communication network 104. The trigger frame could include actual voice packets from the user station or can be a null frame if the MS has no voice packets to send. However, when the US is not transmitting voice packets, the present invention proposes that the US only trigger the download of packets queued at the AP when the jitter buffer 114 of the US is nearly empty, i.e. below the new threshold. As used herein, the US "triggering" the sending of voice packets from the AP packet queue includes any one or more of; sending a trigger frame including voice packets, sending a null trigger frame with no voice packets, sending a voice packet in an access category of an IEEE 802.11 communication system that triggers a download, going out of power save mode, and sending a power save poll (PS-Poll) such as is done in legacy devices. It is envisioned that other triggers may also be used.

Preferably, the newly defined threshold is set to a time period equal to the time from when the US sends a trigger to when the US receives packets from the AP in its jitter buffer. In effect, the processor 112 of the US determines the amount of time needed to trigger a download of one queued packet from the AP and triggers the download that amount of time before the jitter buffer becomes empty. The threshold can be set empirically and dynamically depending on interface conditions, and is typically in the range of five milliseconds. For example, the threshold determination could take into account measurements of how busy the communication interface is, either determined locally or from information contained in the beacon or otherwise received from the AP. In particular, if the AP indicates that the medium is busy, the US would trigger the download sooner than if the AP indicates the medium is idle. Alternatively, the threshold determination may be fixed, such as a fixed ten milliseconds before the last voice packet has completed playback from the jitter buffer.

Therefore, in one embodiment of the present invention, while the US is not transmitting voice packets, such as in an Unscheduled Automatic Power Save Delivery (U-APSD) mode, the US will send a trigger to obtain packets from the packet queue of the AP when the available voice packets in the jitter buffer fall below the threshold, i.e. the jitter buffer is nearly empty. It should be recognized that packets are queued up at the AP ready to be transferred to the US.

In an alternative embodiment, a legacy PS-Poll is used to trigger the download of packets from the AP. However, in accordance with the present invention, a PS-Poll is not needed after every packet is transmitted to the AP, but only when the jitter buffer is nearly empty. This is advantageous when the AP is able to bundle several packets into one larger packet, as specified in IEEE 802.11 standards. In addition, this alternative can be implemented independent of whether the device is sending audio or not.

In another alternative embodiment, the trigger is based on heuristics that the US can use, such as channel activity measurements either measured directly or issued in a beacon, whereupon the US can leave a power saving mode for a short period of time, at which point the AP will transmit multiple-queued packets. When the last queued packet is sent from the AP, the AP will clear a "more data" field in a last packet download frame. After the last packet is sent, recognized as the "more data" field being cleared, the US will transition back to power save mode. This alternative requires that the "more data" field be updated correctly by the AP even if the non-AP station (e.g. US) is not in power save mode. It is necessary in this case that the "more data" field always reflects whether there is more data at an IEEE 802.11 operating AP, not just when the corresponding non-AP station is in power save mode, but even when it is not in power save mode. The reason to use heuristics is that in conditions where the channel is busy it is not advantageous for the US to go out of power save, while if the channel is idle, it is advantageous to use this particular technique.

In another embodiment, a proprietary extension is defined that allows the AP to bundle several standard real-time transport protocol (RTP) packets into a superpacket consisting of the RTP packets. This could be implemented without relying on newer versions of the IEEE 802.11 standard. In this way, only one trigger from the US will deliver multiple packets, which can be acknowledged by one block acknowledgement, which results in battery savings.

In another embodiment, it should be noted that when one party is not talking, the effect of audio delay is reduced. In this case, a (virtual) size of the jitter buffer is temporarily increased to improve the battery savings by raising the maximum fill point of the jitter buffer. The changing of the jitter buffer size could be triggered by the use of a mute button, or by some heuristics related to how often or how long there are no voice transmissions seen on either side. For example, when there are no voice packets being transmitted in the receive stream, the US could set an artificially high jitter buffer delay on that stream, a delay that exceeds the variability of packet arrivals. The US can lower this artificially high jitter buffer delay at the next time there are no voice packets being transmitted in that stream, as would be necessary in the case where both parties are talking Similarly, having no voice packets being transmitted in the receive stream would allow the artificially high jitter buffer delay to be implemented without any noticeable audio gap, as an existing silent-voice based audio gap could be increased to the artificial level. Advantageously, by raising the maximum fill point of the jitter buffer, even fewer polls are needed to get packets from the AP.

When the other party device leaves mute, packets will start arriving. However, in accordance with the present invention the device will not start playing the arriving packets until the delay plus the accumulated times of the number of arriving packets equals the high water mark. Once the jitter buffer is nearly empty, the US can send another trigger where a significant number of packets should be waiting at the AP. At this time the (virtual) size of the jitter buffer can be reduced so as to approach the high water mark.

In another embodiment, it is supposed that there are no voice packet transmissions from both the AP (other party) and US. Sending a trigger for voice packets when the accumulated packet times in the jitter buffer reach some fraction, e.g. 70% but <=100%, of the jitter high water mark. In this mode, voice packets will not be sent to the US at every trigger from the US. In another embodiment, even when either of the AP and US is talking, the present invention can be implemented to reduce the number of service periods to send packets to the US. In particular, the IEEE 802.11 communication system defines particular access categories that do not trigger a download from the AP. A US can send voice packets using one of the access categories that do not trigger a download from the AP. Then when the jitter buffer falls below the threshold, the US can switch the sending of voice packets to an access category that does trigger a download from the AP. In effect the switching of access categories triggers the sending of packets from the AP.

It should be noted that the threshold as defined herein for the present invention is not the same as the previously known low water mark for jitter buffers. The threshold is defined as the amount of time needed to trigger a download of one queued packet from the AP and triggers the download that amount of time before the jitter buffer is empty, and is typically 5 ms to 10 ms. In contrast, the low water mark is a function of an initial network delay d, the initial jitter buffer setting s, and the maximum delay of the network m, so it is s+d−m. If the initial jitter buffer is s=100 ms, the initial network delay is d=40 ms and the maximum network delay is m=80 ms, then the low water mark is 100+40−80, or about 60 ms. Any dynamic jitter buffer reductions are subtracted from this. Any audio gaps mean that the low water mark is going below zero, which is impossible, so after an audio gap, the low water mark is zero If the US is starving for packets, the present invention retains the normal behavior of attempting to download packets every 20 ms.

Figure 2:
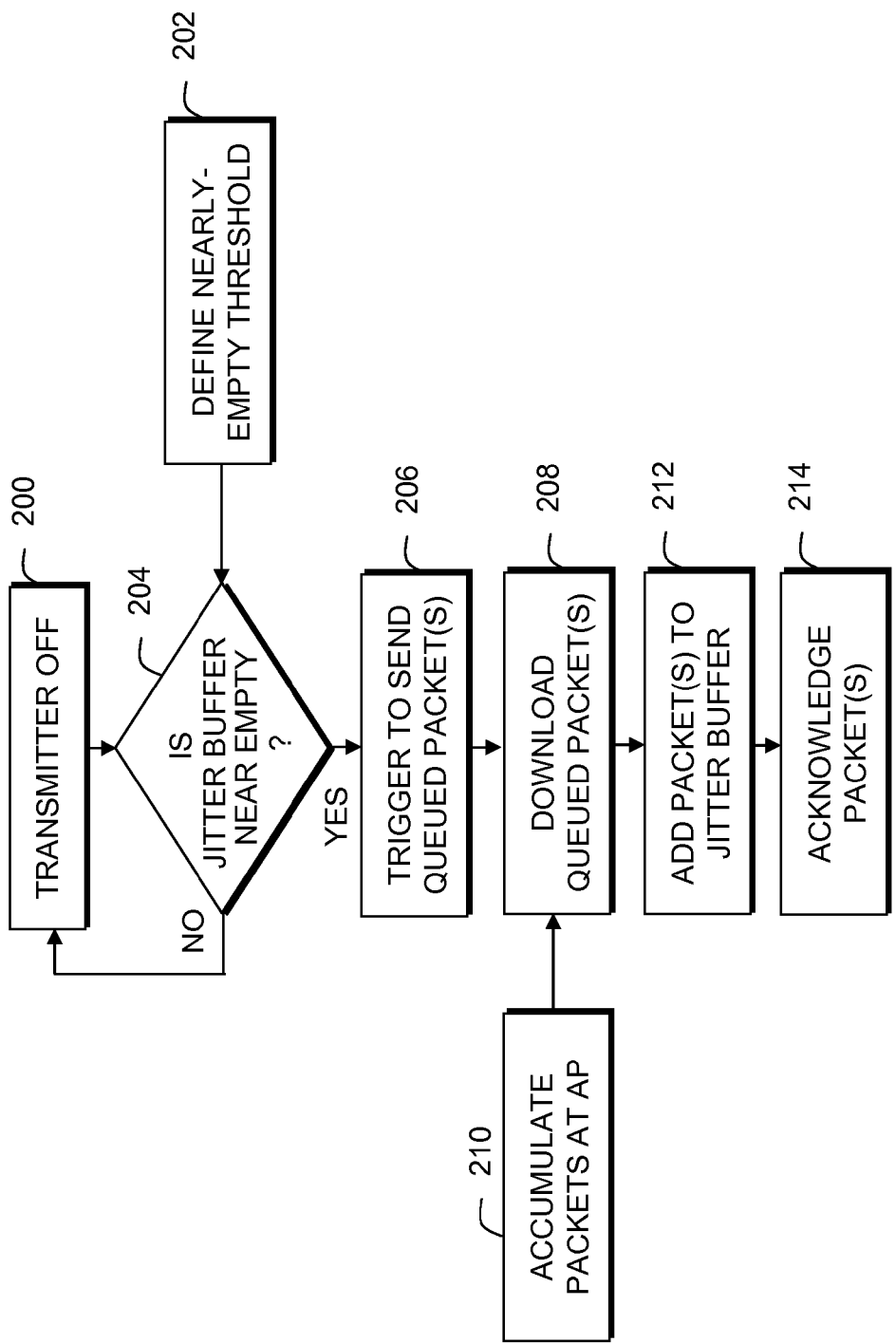
FIG. 2 is a flowchart of a method, in accordance with the present invention.

FIG. 2 illustrates a flowchart of a method for inventory monitoring using complementary modes for item identification, in accordance with the present invention, wherein packets from a communication network are accumulated 210 by an access point (AP). In general, the present invention is operable while the US transmitter is off 200, with the exception noted below.

The method includes defining 202 a jitter buffer threshold for the wireless communication device. The jitter buffer threshold is set equal to an amount of time to perform the sending 206, downloading 208, and adding 212 steps. Defining can further include re-negotiating to increase the number of voice packets that can be sent in a service period. The re-negotiated number of voice packets could be a maximum for a wireless interface being used. Defining can also include temporarily increasing the size of the jitter buffer when there are no voice packets being transmitted by either the user station and access point.

The method also includes determining 204 that an amount of packets in the jitter buffer falls below the threshold.

The method also includes sending a trigger 206 to obtain queued voice packets from an access point. The sending of a trigger include any one or more of; sending a trigger frame including voice packets, sending a null trigger frame with no voice packets, sending a voice packet in an access category of an IEEE 802.11 communication system that triggers a download, and sending a power save poll (PS-Poll) such as is done in legacy devices. The trigger can also include the US leaving a power saving mode due to channel activity measurements. Where the size of the jitter buffer has been increased, and when voice starts flowing in both directions again, triggering can include sending another trigger when a high water mark of the jitter buffer is reached, and reducing the size of the jitter buffer to approach the high water mark. In addition, when there are no voice packet transmissions from either of the AP and US, triggering includes sending a trigger for voice packets when the accumulated packet times reach some predetermined fraction of the jitter high water mark.

The method also includes downloading 208 queued voice packets from the access point. Downloading can also include downloading multiple queued packets until a "more data" field is cleared in a download frame.

The method also includes adding 212 the voice packets from the access point to the jitter buffer in the wireless communication device 100.

The method also includes acknowledging 214 the voice packets received from downloading. This can include one acknowledgement per packet, per service period, or a block acknowledgement for multiple voice packets received from downloading.

The present invention is applicable to battery-powered products using packet-delivered voice, where there is not a scheduled delivery of packets, which implies a requirement for a non-zero jitter buffer due to latency problems in an IEEE 802.11 network. In particular, the present invention reduces the number of triggering frames needed to downloaded packets from the AP. In cases where both parties in a conversation are in DTX, the number of packets transmitted and received can be reduced by a factor nearly corresponding to the number of packets for the high water mark of the jitter buffer. Advantageously, the present invention provide power savings when a IEEE 802.11 user station is muted or in a DTX silence period by intelligent management of the local jitter buffer, as described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for jitter buffer management for improved power savings in a wireless communication device, the method comprising:
    defining a jitter buffer threshold for the wireless communication device, the threshold set to a time period equal to the time from when the device sends a trigger to when the device receives a packet from an access point into the jitter buffer, wherein the threshold is less than a low water mark of the jitter buffer;
    determining that an amount of packets in the jitter buffer falls below the threshold and the jitter buffer is nearly empty;
    sending the trigger to obtain queued voice packets from the access point before the jitter buffer becomes empty;
    downloading queued voice packets from the access point; and
    adding the voice packets from the access point to the jitter buffer in the wireless communication device.

2. The method of claim 1, wherein the jitter buffer threshold is set equal to an amount of time to perform the sending, downloading, and adding steps.

3. The method of claim 1, wherein while the wireless communication device is not transmitting voice packets during determining.

4. The method of claim 1, wherein defining can include re-negotiating to increase the number of voice packets that can be sent in a service period.

5. The method of claim 4, wherein the re-negotiated number of voice packets is a maximum number of packets for a wireless interface being used.

6. The method of claim 1, further comprising the step of acknowledging the voice packets received from downloading.

7. The method of claim 6, wherein acknowledging includes sending one block acknowledgement for multiple voice packets received from downloading.

8. The method of claim 1, wherein sending the trigger includes sending a power save poll.

9. The method of claim 1, wherein sending the trigger includes sending a frame in a particular access category of an IEEE 802.11 communication system that triggers downloading.

10. The method of claim 1, wherein sending the trigger includes leaving a power saving mode due to channel activity measurements, and downloading includes downloading multiple queued packets until a "more data" field is cleared in a download frame by the access point, wherein the "more data" field always reflects whether there is more data at the access point even when the wireless communication device is not in power save mode.

11. The method of claim 1, wherein defining includes temporarily increasing a maximum fill point of the jitter buffer when there are no voice packets being transmitted by either the user station and access point.

12. The method of claim 11, further comprising:
    delaying playing of the packets in the jitter buffer until a jitter buffer delay plus accumulated packet times of the number of added packets equals a high water mark; whereupon playing of the packets commences, and reducing the maximum fill point of the jitter buffer to approach the high water mark.

13. The method of claim 12, wherein when there are no voice packet transmissions from either of the access point and the wireless communication device, sending includes sending the trigger for voice packets when the accumulated packet times in the jitter buffer reach some predetermined fraction of the jitter high water mark.

14. A user station with improved power savings using jitter buffer management, the user station comprising:
    a jitter buffer having a defined threshold set to a time period equal to the time from when the user station sends a trigger to when the user station receives a packet from an access point into the jitter buffer, wherein the threshold is less than a low water mark of the jitter buffer;
    a processor coupled to the jitter buffer, the processor operable to determine that an amount of packets in the jitter buffer falls below the threshold and the jitter buffer is nearly empty; and
    a transceiver coupled to the processor, the transceiver operable under direction of the processor to send the trigger to obtain queued voice packets from the access point before the jitter buffer becomes empty, and download the queued voice packets from the access point, wherein the processor adds the voice packets from the access point to the jitter buffer.

* * * * *